United States Patent [19]

Okamoto et al.

[11] 4,410,591
[45] Oct. 18, 1983

[54] FISHING NETS OF POLYAMIDE RESINS

[75] Inventors: Shigetomi Okamoto, Nara; Yoshio Tonomura, Kyoto, both of Japan

[73] Assignee: Unitika Ltd., Hyogo, Japan

[21] Appl. No.: 403,387

[22] Filed: Jul. 30, 1982

[30] Foreign Application Priority Data

Jul. 30, 1981 [JP] Japan ................................ 56-120095

[51] Int. Cl.³ .............................................. B32B 7/00
[52] U.S. Cl. .................................... 428/255; 428/253; 428/257; 428/373; 428/374; 428/397
[58] Field of Search ............... 428/105, 253, 255, 257, 428/373, 374, 397, 398; 264/171

[56] References Cited

U.S. PATENT DOCUMENTS

| 3,746,827 | 7/1973 | Martin et al. | 428/397 |
| 4,245,001 | 1/1981 | Phillips et al. | 428/373 |
| 4,300,343 | 11/1981 | Nahamura et al. | 428/364 |

Primary Examiner—James J. Bell
Attorney, Agent, or Firm—Sughrue, Mion, Zinn, Macpeak & Seas

[57] ABSTRACT

A fishing net made from conjugated yarns of a polyamide resin comprising one monofilament to the outer periphery of which are fused two other monofilaments in a longitudinal direction. The two other monofilaments are separate from each other, and the three monofilaments form a conjugated angle $\theta$ which is greater than 60 degrees and not greater than 120 degrees.

6 Claims, 6 Drawing Figures (THIS INVENTION)

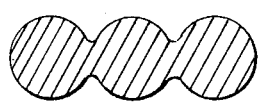
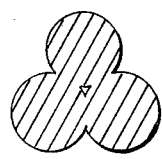
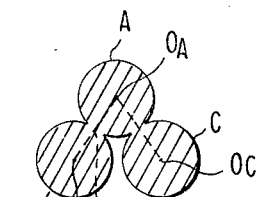
FIG.1 (PRIOR ART)  FIG.2 (PRIOR ART)  FIG.3 (THIS INVENTION)
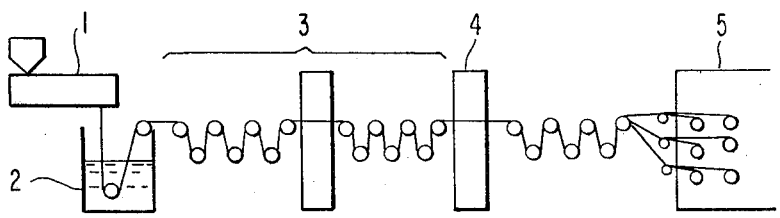
FIG.4
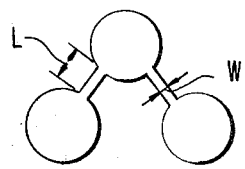
FIG.5  FIG.6

FISHING NETS OF POLYAMIDE RESINS

FIELD OF THE INVENTION

The present invention relates to fishing nets of polyamide resins that have high knot strength and which are particularly suitable for use as gill nets.

BACKGROUND OF THE INVENTION

It is well known that fishing nets of polyamide resins are widely used because of their high strength, transparency and flexibility. In particular, net yarns made of polyamide monofilaments have better transparency and drainage than those made of polyamide multifilaments. In addition, they have a suitable degree of stiffness. Therefore, fishing nets made of polyamide monofilament yarns retain their shape in water a long time and hence achieve high fish catching efficiency. For this reason, fishing nets made of monofilament yarns are gaining acceptance in gilling not only salmon and trout but also other fishes.

The two popular fishing nets made of monofilament yarns that are used as gill nets are:
(1) a fishing net made by knitting yarns each made of a single monofilament having a fineness of from 110 to 6,600 deniers; and
(2) a single-twined (or mono-twined) fishing net made by knitting ply yarns of fine monofilaments (e.g., one made by knitting ply yarns each comprising three twisted monofilaments having a fineness of 330 deniers or between 660 and 1,100 deniers, or one made by knitting ply yarns each comprising 4 to 24 monofilaments having a fineness of from 110 to 440 deniers).

These nets made from monofilaments have knots, and at these knots, the individual monofilaments are pressed by each other and are subjected to lateral pressure. Therefore, the knots are weaker than the net legs and may easily break during service. So, there has been an along-felt need to improve the knot strength of monofilaments without losing their inherent good characteristics.

SUMMARY OF THE INVENTION

As a result of various studies carried out to find a commercially desirable and useful net, the present inventors have found that a fishing net made by knitting conjugated yarns (i.e., connected yarns) of a certain shape has high knot strength.

Therefore, the present invention provides a new fishing net having high knot strength which is suitable for use as a gill net. The fishing net of the present invention is made by knitting conjugated yarns comprising a monofilament yarn (A), a monofilament yarn (B) conjugated longitudinally to the filament yarn (A), and a monofilament yarn (C) conjugated longitudinally to the filament yarn (A). The conjugated yarn comprises one monofilament yarn (A) to the outer periphery of which two separate monofilament yarns (B) and (C) are fused in a longitudinal direction. The conjugated $\theta$ formed by the three monofilament yarns (A), (B) and (C) is greater than 60 degrees but not greater than 120 degrees ($60° < \theta \leq 120°$). The conjugated angle $\theta$ formed by the three monofilament yarns (A), (B) and (C) is represented by $\angle O_B O_A O_C$, $O_A$, $O_B$ and $O_C$ being the centers of the filament yarns (A), (B) and (C), respectively.

Bonded yarns wherein polyolefin or polyvinylidene chloride monofilaments are fused to each other are known, and methods for making them are described in Japanese Patent Publication Nos. 32621/73 and 32981/73. The former relates to a bonded yarn as shown in FIGS. 1 or 2 which is made of a plurality of loosely bonded polyolefin monofilaments and is used as a discrete monofilament yarn. The latter relates to a multifilament made of a plurality of polyvinylidene chloride monofilaments that are fusion-bonded so it can be wound into a compact bundle. Obviously, each of these conventional yarns differs essentially from the conjugated yarn of the present invention.

BRIEF DESCRIPTION OF THE DRAWINGS

FIGS. 1 and 2 are cross sections of conventional bonded yarns;

FIG. 3 is a cross section of the conjugated yarn according to one embodiment of the present invention;

FIG. 4 is a schematic diagram showing the process for making the conjugated yarn of the present invention;

FIG. 5 is a plan view showing one embodiment of the spinneret used for making the conjugated yarn of the present invention; and FIG. 6 is a plan view of an English Knot.

DETAILED DESCRIPTION OF THE INVENTION

The polyamide conjugated yarn used in the present invention comprises one monofilament (A) to the outer periphery of which are fused two monofilaments (B) and (C) in a longitudinal direction. The monofilaments (B) and (C) must be separate from each other. If they are not separate and fused to each other, poor cooling balance in the spinning step and insufficient heat receiving in the drawing step result in a conjugated yarn having only low knot strength.

FIG. 3 is a cross section of the conjugated yarn according to one embodiment of the present invention. In the illustration, one monofilament (A) is conjugated (i.e., connected) with two separate monofilaments (B) and (C) having the same diameter as that of filament (A). The monofilaments (B) and (C) may slightly differ from monofilament (A) in diameter, but it is preferred that the three monofilaments have substantially the same diameter to minimize bending stress.

The other requirement for the conjugated yarn of the present invention is that the three monofilaments (A), (B) and (C) form a conjugated angle $\theta$ greater than 60 degrees but not greater than 120 degrees ($60° < \theta \leq 120°$). The conjugated angle $\theta$ here used is represented by $\angle O_B O_A O_C$, $O_A$, $O_B$ and $O_C$ being the respective centers of filaments (A), (B) and (C). Monofilament net yarns had an oval cross section when there was no suitable filler resin in the early times of their development. However, as resin processing techniques advanced, their cross section became closer to that of a circle. To make a monofilament fishing net having high knot strength, the yarn must have a shape similar to that of a mono-twined ply yarn of three monofilaments or a paralleled yarn of two or more monofilaments. The present inventors made a series of experiments on the basis of these facts and found that the desired objects can be achieved by using a conjugated angle $\theta$ greater than 60 degrees but not greater than 120 degrees ($60° < \theta \leq 120°$), and more preferably the ranges of from about 75° to 105°.

If the conjugated angle is 60 degrees or less, a hollow yarn similar to the conventional bonded yarn of FIG. 2 is often formed, and the resulting net has low knot strength. If the conjugated angle exceeds 120 degrees, a yarn similar to the conventional bonded yarn of FIG. 1 results, and it is difficult to knit such yarn into a fishing net. What is more, it reflects so much light that the net made of it has low fish catching ability.

The conjugated yarn of the present invention is prepared by the sequence of steps illustrated in FIG. 4. A molten polyamide resin is extruded from a melt extruder 1 through a nozzle or spinneret having the holes shown in FIG. 5, and the resulting undrawn conjugated yarn made of three monofilaments fused to each other is cooled in water in a cooler 2 and, thereafter, it is drawn in a multi-stage drawing machine 3, heat-treated in a heater 4 and wound up in a winder 5.

FIG. 5 shows a cross section of the spinneret used in making the conjugated yarn of the present invention. As shown, the spinneret consists of one circular hole that is connected to two other circular holes at a predetermined angle by slits. The dimensions of the respective holes, i.e., their diameter, slit width (W) and length (L), can be varied properly according to the use of the fishing net and other factors. Preferably, the slit has maximum width (W) and minimum length (L) with the condition that it does not substantially impair the circularity and balance of the individual monofilaments. For instance, a spinneret having a slit width (W) of 0.1 mm, a slit length (L) of 0.15 mm and a hole diameter of 0.8 mm can provide a conjugated yarn suitable for gill nets. The spinneret need not have slits that connect the individual circular holes. The holes may be spaced at intervals that permit the extruded monofilaments to fuse to each other in the area of from several millimeters to several centimeters below the spinneret. But a spinneret with slits is preferred since it consistently provides a conjugated yarn having the desired shape and quality.

The so prepared conjugated yarn is not subjected to a twisting step, but a single conjugated yarn or a plurality of paralleled conjugated yarns are knitted into a fishing net by a known method. The resulting fishing net is particularly suitable for use as a gill net.

The term "polyamide" as used herein means polymers which have an amide bond in the molecular chain. The preferred examples of useful polyamides include nylon homopolymers such as nylon 6, nylon 66, nylon 610 and nylon 12, and nylon copolymers, and blend polymers thereof.

As described above, the fishing net of the present invention is comprised of knitted conjugated yarns each comprising one monofilament to the outer periphery of which are fused two separate monofilaments in a longitudinal direction. The three filaments form a conjugated angle $\theta$ greater than 60 degrees but not greater than 120 degrees ($60° < \theta \leq 120°$). Because of this structure, the fishing net of the present invention has a higher knot strength than the conventional net using mono-twined ply yarns of three monofilaments.

Since the two monofilaments fused to the other filament are separate from each other, the conjugated yarn of the present invention has better cooling balance in the spinning step and higher heat receiving efficiency in the drawing step than conventional bonded yarn wherein all three monofilaments are fused to each other. Therefore, the conjugated yarn of the present invention can be manufactured with high efficiency and a fishing net of consistent quality can be made from such yarn.

As a further advantage, the conjugated yarn of the present invention can be knitted into a net without a twisting step. It also has a suitable stiffness and flexibility balance and provides a net that retains its shape a long time in water. For these reasons, the present invention offers a product that is particularly suitable for use as a gill net.

The present invention is now described in greater detail by reference to the following examples to which the invention is by no means limited.

The physical properties indicated for the samples prepared in the examples were measured by the following methods.

1. Knot strength (in accordance with JIS-L 1034, JIS refers to Japan Industry Standard):

A specimen is set in a tensile tester wherein one end of the specimen is attached to the upper holder and the other end is attached to the lower holder (the distance between the two holders is 25 cm) and an initial standard load of 1/30 g per denier indicative of the fineness of the specimen is applied. The specimen is stretched at a rate of 30 cm/min until it breaks. The knot strength is indicated by the average of ten measurements of the load at break (g/d).

2. Apparent Young's modulus (in accordance with JIS-L 1073):

A specimen is set in a tensile tester wherein one end of the specimen is attached to the upper holder and the other end is attached to the lower holder (the distance between the two holder is 25 cm) and an initial standard load of 1/30 g per denier indicative of the fineness of the specimen is applied. The specimen is stretched at a rate of 30 cm/min and a load vs. elongation curve is drawn by plotting the load (g) on the y-axis and the elongation (mm) on the x-axis. Point A on the curve which is the closest to the origin and where the ratio of the change in load to that in elongation is maximum (i.e., the point where the line tangential to the curve intersects the x-axis at maximum angle) is determined and put in formula (1) for calculation of the initial resistance to stretching, which then is put in formula (2) to calculate the apparent Young's modulus (kg/mm²). It is indicated by the average of ten measurements.

$$\text{Initial resistance to stretching } (g/d) = \frac{P}{\frac{L'}{L} \times D} \quad (1)$$

wherein
P: the load (g) at point A
D: the fineness of the specimen (d)
L: the length of the sample (mm) (distance between the holders)
L': the distance (mm) between the point at which the line tangential to point A intersects the x-axis and the point at which the line passing through point A and perpendicular to the x-axis intersects the x-axis $$\text{Apparent Young's modulus (kg/mm}^2\text{)} = 9 \times \rho \times \text{initial resistance to stretching} \quad (2)$$

wherein $\rho$: the density of the specimen (g/cm³)

3. Bending stress (flexural stress)

A sample under the initial standard load is left in a test chamber under normal conditions (20±2°C., R.H. 65±2%) to remove the tendency of the sample to bend. The specimen is then cut to a length of 3 cm and supported on two fulcrums 2 cm apart in a tensile tester. It is stretched at a rate of 1 cm/min with a load applied to the center. The bending stress (g) is indicated by the average of ten measurements of the load (g) necessary to bend the specimen by 1 mm.

4. Mesh strength and mesh elongation (in accordance with JIS-L 1043)

Two steel hooks having a diameter of 5 mm are attached to a tensile tester. One hook seizes the center of a leg between knots of an oblique mesh in the net specimen and the other hook seizes the center of the opposite leg. The specimen is stretched in opposite directions at a rate of 30 cm/min until it breaks. The mesh strength (kg) and mesh elongation (%) are indicated by the average of ten measurements of the load (kg) and elongation (%) at break. The initial distance between the two hooks is equal to the mesh size at the knot.

5. Net strength

The net strength is calculated by dividing the mesh strength (see Par. 4) in grams by the fineness (d) of the net sample.

6. Knot slip ratio

The knot slip ratio is a measure of slippage of knots in a net and is determined by the following formula:

$$\text{Knot slip ratio (\%)} = \frac{\text{Strength at which the knot begins to slip}}{\text{Strength at which the knot is cut}} \times 100$$

These methods of the above measurements 1 to 6 apply to a dry specimen under normal conditions, but they also apply to a wet specimen that is prepared by soaking the dry specimen in water at 20±2°C. for 12 hours.

The relative viscosity ($\eta$ rel.) of the polymer used in the examples was measured at 25°C. by dissolving the 0.5 g of the sample in 50 cc of 96% sulfuric acid.

EXAMPLE 1

Nylon 6 chips ($\eta$ rel.=3.0) were melt-spun through a spinneret having the cross section shown in FIG. 5 (circular hole diameter: 0.8 mm, slit width: 0.1 mm, slit length: 0.15 mm), cooled in water to solidify, drawn and heat-treated to produce three samples of conjugated yarn having a total fineness of 1,980, 2,640 and 3,300 deniers, respectively. Each conjugated yarn had a cross section as shown in FIG. 3 and had a conjugated angle of about 90 degrees. For comparison, three samples of mono-twined ply yarn made of three monofilaments were prepared. The respective monofilaments had fineness of 660, 880 and 1,100 deniers. The six samples were measured for their knot strength on both dry and wet bases. The results are shown in Table 1.

TABLE 1

|  | 660 d. × 3 | | 880 d. × 3 | | 1,100 d. × 3 | |
|---|---|---|---|---|---|---|
|  | This Invention Conjugated Yarn | Comp. Ex. 3-Ply | This Invention Conjugated Yarn | Comp. Ex. 3-Ply | This Invention Conjugated Yarn | Comp. Ex. 3-Ply |
| Dry Knot Strength (g/d) | 3.85 | 3.33 | 3.66 | 3.10 | 3.54 | 2.96 |
| Wet Knot Strength (g/d) | 3.64 | 3.29 | 3.53 | 3.23 | 3.42 | 3.23 |

The data shows that the three samples of the conjugated yarn of the present invention had a higher knot strength both on dry and wet bases than the three mono-twined three-ply yarns having the corresponding values of fineness.

EXAMPLE 2

Nylon 6 chips ($\eta$ rel.=3.0) (Experiment No. 1), chips of a blend of nylon 6 and nylon 6/66 copolymer ($\eta$ rel.=3.2) (Experiment No. 2) and chips of a nylon 6/66 copolymer ($\eta$ rel.=4.0) (Experiment No. 3) were respectively melt-spun through a spinneret having the cross section of FIG. 5 and treated as in Example 1 to make three samples of the conjugated yarn of the present invention having a fineness of 990 deniers. Each conjugated yarn had a cross section as shown in FIG. 3 and a conjugated angle of about 90 degrees. For comparison, three samples of bonded yarn each having a fineness of 990 deniers were prepared from nylon 6 chips, chips of a blend of nylon 6 and nylon 6/66 copolymer and chips of a nylon 6/66 copolymer, respectively. They had a cross section as shown in FIG. 2. The six samples were measured for their dry knot strength, wet knot strength, dry Young's modulus, wet Young's modulus, dry bending stress and wet bending stress. The results are listed in Table 2.

TABLE 2

|  | Experiment No. | | | | | |
|---|---|---|---|---|---|---|
|  | 1 | | 2 | | 3 | |
|  | Conjugated Yarn | Bonded Yarn | Conjugated Yarn | Bonded Yarn | Conjugated Yarn | Bonded Yarn |
| Dry Knot Strength (g/d) | 4.37 | 3.86 | 4.61 | 4.08 | 4.88 | 3.92 |
| Wet Knot Strength (g/d) | 4.20 | 3.73 | 4.36 | 3.59 | 4.34 | 3.72 |
| Dry Young's Modulus (kg/mm$^2$) | 377 | 421 | 354 | 350 | 298 | 304 |
| Wet Young's Modulus (kg/mm$^2$) | 111 | 224 | 103 | 160 | 66 | 130 |
| Dry Bending Stress (g) | 7.39 | 12.31 | 6.54 | 8.70 | 3.21 | 3.23 |
| Wet Bending Stress (g) | 3.40 | 4.48 | 3.08 | 3.50 | 1.56 | 1.58 |

As is clear from Table 2, all samples of the conjugated yarn of the present invention had dry and wet knot strength values 10 to 20% higher than those of the bonded yarns wherein three monofilaments were fused to each other. The data on Young's modulus and bending stress indicates the high flexibility of the conjugated yarn of the present invention. A sensory evaluation showed that the nets made by knitting the samples of the conjugated yarn of the present invention had a better texture than those made by knitting the samples of bonded yarn.

The sample of conjugated yarn prepared in Experiment 1 was knitted directly (without twisting) into a gill net having double English Knots shown in FIG. 6 and a mesh size at each knot of 116 mm. For comparison, two gill nets were prepared from a mono-twined ply yarn of three monofilaments having a fineness of 330 denier and from a yarn made of a single monofilament having a fineness of 1,100 deniers. The physical properties of the three nets were measured, and the results are shown in Table 3.

TABLE 3

|  | Conjugated Yarn (330 d. × 3) | Mono-Twined 3-Ply Yarn (330 d. × 3) | Monofilament Yarn (1,100 d.) |
| --- | --- | --- | --- |
| Dry Condition |  |  |  |
| Mesh Strength (kg) | 7.4 | 6.7 | 7.4 |
| Mesh Elongation (%) | 20 | 30 | 30 |
| Mesh Slip Ratio (%) | 85 | 70 | 70 |
| Net Strength (g/d) | 7.5 | 6.7 | 6.7 |
| Wet Condition |  |  |  |
| Mesh Strength (kg) | 6.4 | 5.8 | 6.5 |
| Mesh Elongation (%) | 18 | 30 | 30 |
| Mesh Slip Ratio (%) | 75 | 65 | 65 |
| Net Strength (g/d) | 6.5 | 5.9 | 5.9 |

As is clear from Table 3, the net made of the conjugated yarn of the present invention had dry and wet mesh strength values which were about 10% higher than those of the net made from the mono-twined ply yarn of three 330 denier monofilaments and were substantially equal to those of the net made from the 1,100 denier monofilament yarn thicker than the conjugated yarn. The net made of the conjugated yarn of the present invention had a net strength about 10% higher than those of the comparative samples. The same net had a dry mesh slip ratio and a wet mesh slip ratio that were higher than those of the comparative samples by 15% and 10%, respectively.

From the foregoing experimental results, it can be seen that the fishing net having high knot strength can be provided by knitting conjugated yarns comprising three monofilaments in a certain shape wherein the three monofilaments form a conjugated angle ($\theta$) of the specific range. The exact reasons of such improved results obtained with the fishing net made from the conjugated yarns according to the present invention are still not made clear. However, they will be construed as follows:

(1) Comparison between the fishing net made from the conjugated yarns of the present invention and the conventional fishing net made from the single monofilament having a same fineness as in the conjugated yarn of the present invention:

Since the fishing nets of the present invention are made from the conjugated yarns comprising the three monofilaments forming a specific conjugated angle ($\theta$), they have a high knot strength because of a large surface area of yarn and the increase of area of the knot portion as compared with the conventional net made from the single monofilament.

Further, since the yarns of the present invention are difficult to be fastened at the knot portion thereof and the knot portion is hardly cut as compared with the conventional nets, the high knot strength can be obtained.

(2) Comparison between the fishing net made from the conjugated yarns of the present invention and the fishing net made from the conventional mono-twined 3-ply yarn:

In the fishing net of the present invention, the load is uniformly applied to a whole of the yarn without concentrating only at the knot portion of one monofilament of that constituting a yarn. Therefore, they are hardly cut and have an excellent knot strength.

On the other hand, in the conventional fishing net made from the 3-ply yarn, since the slipping easily occurs at one knot portion between the individual monofilaments which constitute the 3-ply yarn, the difference in monofilament length between the two neighboring knot portions is present, and as results, the forces are concentrated only at the knot portion of one filament of three monofilaments, and so the filament is easy to be cut. Therefore, in the conventional net, the knot strength thereof will be considered to be decreased and it is not suitable for attaining the object of the invention.

While the invention has been described in detail and with reference to specific embodiments thereof, it will be apparent to one skilled in the art that various changes and modifications can be made therein without departing from the spirit and scope thereof.

What is claimed is:

1. A conjugated yarn, polyamide resin fishing net, comprising:
   a monofilament yarn (A);
   a monofilament yarn (B) conjugated longitudinally to the filament yarn (A); and
   a monofilament yarn (C) conjugated longitudinally to the filament yarn (A), and the filament yarns (A), (B) and (C) having center points $O_A$, $O_B$ and $O_C$ and being connected such that the center points form a conjugated angle $\theta$ which is greater than 60° and not greater than 120°.

2. A conjugated yarn, polyamide resin fishing net, as claimed in claim 1, wherein the angle $\theta$ is about 75° to 105°.

3. A conjugated yarn, polyamide resin fishing net, as claimed in claim 1, wherein the polyamide resin is a nylon homopolymer.

4. A conjugated yarn, polyamide resin fishing net, as claimed in claim 1, wherein the polyamide resin is a nylon copolymer.

5. A conjugated yarn, polyamide resin fishing net, as claimed in claim 1, wherein the polyamide resin is a blended polymer of homopolymer and copolymer.

6. The conjugated yarn fishing net of claim 1, wherein monofilament yarns (B) and (C) are separate from each other.

* * * * *